Aug. 21, 1945.  P. M. HARDWICK  2,383,249
HOSE COUPLING WITH CHECK VALVE
Filed May 13, 1943

WITNESS:
Robt R Kitchel

INVENTOR
Pierre M. Hardwick
BY
Augustus B. Stoughton
ATTORNEY.

Patented Aug. 21, 1945

2,383,249

UNITED STATES PATENT OFFICE 2,383,249

HOSE COUPLING WITH CHECK VALVE

Pierre M. Hardwick, Altadena, Calif.

Application May 13, 1943, Serial No. 486,795

4 Claims. (Cl. 284—19)

Certain types of hose, such as air hose, consisting of hose sections coupled together are often used in long lengths connected at one end to a source of air at high pressure through an inlet valve and at the other end to a tool, machine or device using the air under pressure; and, in the absence of means to shut off the air pressure at the place where it is desired to disconnect the line, it is necessary to send a man back to the inlet valve to shut off the air pressure, thus causing loss of time and inconvenience.

One object of the present invention is to provide simple, compact and efficient means for connecting and disconnecting the hose while under pressure at any point in its length where such means are located and which means, by the simple act of mechanical connection, mechanically permit flow of fluid under pressure through the hose; and, by the simple act of disconnection, automatically shut off the flow.

Another object is to mechanically establish a flow of fluid under pressure by the simple operation of making the connection without the exertion of undue force by the person making it.

Another object of the invention is to minimize friction loss of pressure in the line by the installation therein of devices embodying features of the invention.

Another object of the invention is to insure that the mechanical and automatic operation of the device shall take place as a necessary result of connecting and disconnecting the hose and without any additional manipulation.

Other objects of the invention will appear from the following description at the end of which the invention will be claimed.

The invention comprises the improvements to be presently described and finally claimed.

In the following description, reference will be made to the accompanying drawing forming part hereof and in which.

Figure 1:
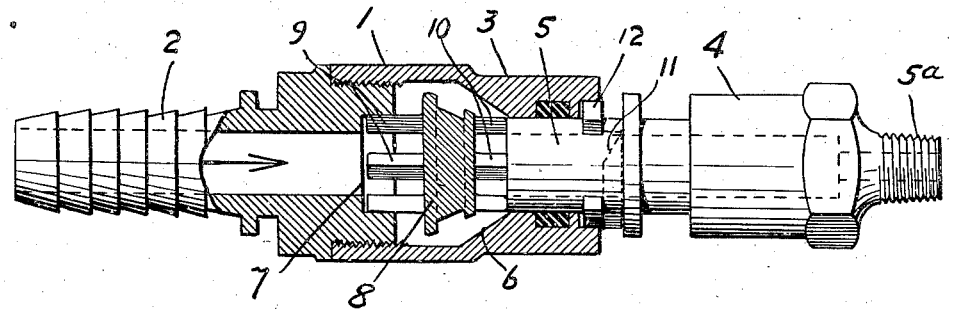
Fig. 1 is an elevational view with parts in central section embodying features of the invention.
Figure 2:
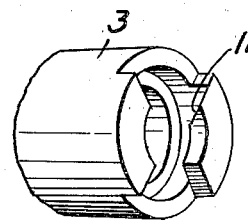
Fig. 2 is a perspective view of the end of the half-coupling shown at the left in Fig. 1.
Figure 3:
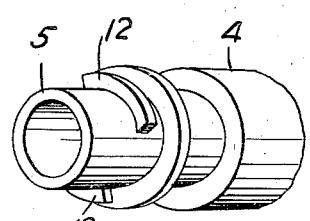
Fig. 3 is a similar view of the right-hand end of the coupling shown in Fig. 1.

Referring to the drawing, 1 designates a hollow valve body provided at one end with a tubular shank connection 2 for connection with a supply of high pressure fluid. As shown, the shank 2 is adapted for connection with a hose but it may be constructed for attachment to any supply or source of high pressure fluid such as air under pressure. At the other end, the valve body is provided with a tubular neck 3 for the reception of a tubular coupling element 4 and its projecting nipple 5. The element 5ª of the coupling element may be variously formed according to the device with which it is to be connected; for example, a pneumatic tool or an additional hose length.

The valve body 3 is internally provided with a valve seat 6 confronting the high pressure shank 2 and with a stop flange 7 spaced from the seat. 8 is a check valve of less cross-sectional area than the internal cross-sectional area of the valve body 1. This check valve is freely movable inside the body between the stop 7 and the valve seat 6 to cover and uncover the opening in the neck 3. The valve is provided at its respective faces with oppositely disposed projecting fingers of which one set 9 co-operates with the stop 7 to limit the opening movement of the valve, and of which the other set 10 projects into said neck and into range of the nipple 5 by the insertion of which the valve is mechanically pushed open and, by the removal of which the valve is caused to close under fluid pressure. The neck 3 is provided with a bevel-ended groove 11 for the reception of a segment of a flange 12 on the element 4, whereby the opening movement of the valve is facilitated.

Figure 6:
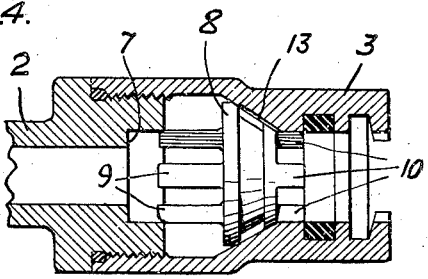
Fig. 6 is a similar view illustrating another modification.

To facilitate the opening of the valve 8, a bypass notch or groove 13 is shown in Fig. 6 and, in that case, as soon as the valve is cracked, or lifted or pushed slightly from its seat, there is balanced pressure on the respective faces of the valve.

Figure 5:
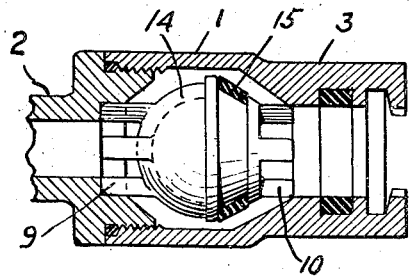
Fig. 5 is a sectional view illustrating a modification.

In order to minimize friction flow, the body of the valve may be made generally spherical as shown at 14 in Fig. 5. In that figure, there is also shown a washer 15 on the valve but such washer is not in all cases necessary or desirable.

To facilitate the manufacture as well as assembly and disassembly, the body 1 and shank 2 are shown as made in two parts threaded together.

From the foregoing description, the mode of operation of the coupling will be readily understood as will also be the fact that the mere act of coupling the halves 1 and 4 of the coupling will cause the nipple 5 to push on the fingers 10 and, in that way, they will mechanically open the valve and establish a flow of fluid under pressure. It may be observed that no other manipulation than that referred to is required for the purpose. When the parts 1 and 4 are uncoupled, the fluid under pressure causes the valve to automatically seat and cut off the flow of air under pressure.

16 indicates a washer arranged in a suitable groove provided in the inner face of the tubular neck 3 and it co-operates with the exterior surface of the projecting nipple 5.

Figures 4, 7, 8:
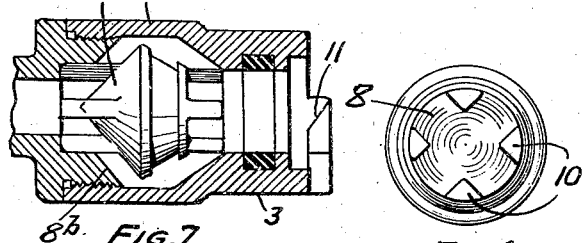
Fig. 4 is a view of the right-hand end of the check valve shown in Fig. 1.
Fig. 7 is a view similar to Fig. 1 illustrating a modification in which the back of the check valve is conical instead of flat.
Fig. 8 is a partial side view or elevation of the device showing a modification.

The construction and mode of operation of the modifications shown in Figs. 7 and 8 are as above described except that, in Fig. 7, the back 8a of the check valve is conical instead of flat, and the confronting portion 8b of the body is in the form of a conic frustum and, by this construction, flow through the coupling is facilitated.

Referring to Fig. 8, the bevel 11a is transferred from the tubular neck 3 to the tubular coupling element 4.

It will be obvious to those skilled in the art to which the invention relates that modifications may be made in details of construction and arrangement and in matters of mere form without departing from the spirit of the invention.

I claim:

1. In a hose fitting provided with built-in check valve and having a hollow internally unobstructed valve body provided at one end with a tubular shank and at the other end with a tubular neck and with a valve seat and having a valve, the combination of two sets of oppositely disposed spaced fingers projecting from the respective faces of the valve and of which one set projects into the shank and slides on the internal cylindrical surface thereof when the valve is open and seats on a stop flange provided in the shank and of which the other set slides on the internal cylindrical face of the tubular neck when the valve is open.

2. In a hose fitting provided with built-in check valve and having a hollow valve body provided at one end with a tubular shank and at the other end with a tubular neck and with a valve seat and having a valve, the combination of two sets of oppositely disposed spaced fingers projecting from the respective faces of the valve and of which one set projects into and slides on the internal cylindrical surface in the neck and the other set projects into and slides on the internal cylindrical surface in the shank.

3. The construction substantially as set forth in claim 1 and in which the neck is provided with a bevel-ended groove for the reception of a segment of a flange whereby the opening movement of the valve is facilitated.

4. The construction substantially as set forth in claim 1 and in which a bypass is provided at the valve.

PIERRE M. HARDWICK.